United States Patent
Geelen et al.

(10) Patent No.: US 10,156,448 B2
(45) Date of Patent: Dec. 18, 2018

(54) METHOD OF CREATING MAP CORRECTIONS FOR USE IN A NAVIGATION DEVICE

(71) Applicant: TomTom International B.V., Amsterdam (NL)

(72) Inventors: Pieter Geelen, Amsterdam (NL); Harold Goddijn, Amsterdam (NL)

(73) Assignee: TOMTOM NAVIGATION B.V., Amsterdam (NL)

( * ) Notice: Subject to any disclaimer, the term of this patent is extended or adjusted under 35 U.S.C. 154(b) by 44 days.

(21) Appl. No.: 14/617,262

(22) Filed: Feb. 9, 2015

(65) Prior Publication Data
US 2015/0153186 A1    Jun. 4, 2015

Related U.S. Application Data

(63) Continuation of application No. 11/889,711, filed on Aug. 15, 2007, now Pat. No. 8,972,188.

(Continued)

(30) Foreign Application Priority Data

Aug. 15, 2006 (GB) .................................. 0616211.9

(51) Int. Cl.
| | |
|---|---|
| *G01C 21/26* | (2006.01) |
| *G01C 21/32* | (2006.01) |
| *G06Q 50/00* | (2012.01) |

(52) U.S. Cl.
CPC ............. *G01C 21/26* (2013.01); *G01C 21/32* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 5,243,528 A | * | 9/1993 | Lefebvre | G01C 21/367 340/990 |
| 5,504,482 A | * | 4/1996 | Schreder | G01C 21/26 340/988 |

(Continued)

FOREIGN PATENT DOCUMENTS

| | | |
|---|---|---|
| CN | 1605833 A | 4/2005 |
| CN | 1670482 A | 9/2005 |

(Continued)

OTHER PUBLICATIONS

International Search Report dated Feb. 26, 2008 for International Application No. PCT/EP2007/007305.

(Continued)

*Primary Examiner* — Rami Khatib

(57) ABSTRACT

An end-user can input a correction to a map error, directly on the device. The device is then able to use the correction without external processing of the correction. Hence, it is no longer necessary for an end-user to simply report errors to the map vendor over a web link, then wait for that map vendor to verify the error, update its maps and finally supply the end-user with updates—a cycle that can take months and sometimes years to complete. Instead, the navigation device can use the correction immediately. End-users can also share corrections with other end-users and also with a shared remote server that aggregates, validates and distributes correction.

18 Claims, 11 Drawing Sheets

Related U.S. Application Data

(60) Provisional application No. 60/901,309, filed on Feb. 15, 2007.

(56) References Cited

U.S. PATENT DOCUMENTS

| | | | |
|---|---|---|---|
| 5,629,854 A * | 5/1997 | Schulte | G01C 21/3632 |
| | | | 701/431 |
| 5,867,804 A * | 2/1999 | Pilley | G01C 23/00 |
| | | | 340/961 |
| 5,951,620 A | 9/1999 | Ahrens et al. | |
| 6,075,467 A | 6/2000 | Ninagawa | |
| 6,138,072 A | 10/2000 | Nagai | |
| 6,253,151 B1 | 6/2001 | Ohler et al. | |
| 6,314,367 B1 | 11/2001 | Ohler et al. | |
| 6,317,685 B1 | 11/2001 | Kozak | |
| 6,453,233 B1 | 9/2002 | Kato | |
| 6,546,334 B1 | 4/2003 | Fukuchi et al. | |
| 6,549,847 B2 | 4/2003 | Ikeuchi et al. | |
| 6,853,905 B2 | 2/2005 | Barton | |
| 6,859,723 B2 | 2/2005 | Yokota | |
| 6,895,331 B2 | 5/2005 | Yoshida | |
| 6,904,263 B2 | 6/2005 | Grudnitski et al. | |
| 7,277,846 B2 | 10/2007 | Satoh | |
| 7,403,851 B2 | 7/2008 | Kaufman et al. | |
| 7,406,482 B2 | 7/2008 | Dorum et al. | |
| 7,428,460 B2 | 9/2008 | Atarashi et al. | |
| 7,480,565 B2 * | 1/2009 | Ikeuchi | G01C 21/32 |
| | | | 340/995.1 |
| 7,496,447 B2 * | 2/2009 | Tanaka | G01C 21/32 |
| | | | 340/995.12 |
| 7,496,484 B2 | 2/2009 | Agrawala et al. | |
| 7,571,029 B2 | 8/2009 | Dai et al. | |
| 7,584,049 B2 | 9/2009 | Nomura | |
| 7,590,488 B2 | 9/2009 | Tu | |
| 7,590,538 B2 | 9/2009 | St John | |
| 7,647,174 B2 | 1/2010 | Kwon | |
| 7,734,684 B2 | 6/2010 | Zeng et al. | |
| 7,739,037 B2 | 6/2010 | Sumizawa et al. | |
| 7,890,255 B2 | 2/2011 | Ikeuchi et al. | |
| 7,930,099 B2 | 4/2011 | Iwahori | |
| 8,151,210 B2 | 4/2012 | Nezu et al. | |
| 8,788,469 B2 | 7/2014 | Ouchi | |
| 2001/0037203 A1 | 11/2001 | Satoh | |
| 2002/0082773 A1 | 6/2002 | Ikeuchi et al. | |
| 2003/0023375 A1 | 1/2003 | Yoshida | |
| 2003/0027121 A1 | 2/2003 | Grudnitsky et al. | |
| 2004/0172418 A1 | 9/2004 | Dorum et al. | |
| 2004/0186661 A1 | 9/2004 | Barton | |
| 2004/0204833 A1 * | 10/2004 | Yokota | G01C 21/3611 |
| | | | 701/455 |
| 2005/0010963 A1 | 1/2005 | Zeng et al. | |
| 2005/0049784 A1 | 3/2005 | Ikeuchi et al. | |
| 2005/0102098 A1 * | 5/2005 | Montealegre | G01C 21/3484 |
| | | | 701/533 |
| 2005/0143902 A1 * | 6/2005 | Soulchin | G01C 21/3635 |
| | | | 701/117 |
| 2005/0216511 A1 | 9/2005 | Umezu et al. | |
| 2005/0267676 A1 * | 12/2005 | Nezu | B60K 35/00 |
| | | | 701/532 |
| 2006/0047676 A1 | 3/2006 | Ouchi | |
| 2006/0074547 A1 | 4/2006 | Kaufman et al. | |
| 2006/0095202 A1 | 5/2006 | Atarashi et al. | |
| 2006/0173613 A1 | 8/2006 | Iwahori | |
| 2006/0173614 A1 | 8/2006 | Nomura | |
| 2006/0253246 A1 * | 11/2006 | Cera | G08G 1/096861 |
| | | | 701/117 |
| 2006/0276961 A1 * | 12/2006 | Kwon | G01C 21/30 |
| | | | 701/431 |
| 2007/0073562 A1 * | 3/2007 | Brice | G06Q 10/02 |
| | | | 705/5 |
| 2007/0078570 A1 | 4/2007 | Dai et al. | |
| 2007/0124064 A1 | 5/2007 | Fukui et al. | |
| 2007/0159355 A1 * | 7/2007 | Kelly | G01C 21/3694 |
| | | | 340/905 |
| 2007/0204218 A1 * | 8/2007 | Weber | G01C 21/20 |
| | | | 715/234 |
| 2007/0244636 A1 | 10/2007 | Horikami | |
| 2007/0299605 A1 | 12/2007 | Onishi et al. | |
| 2008/0040031 A1 | 2/2008 | Tu | |
| 2008/0082225 A1 * | 4/2008 | Barrett | G01C 21/32 |
| | | | 701/26 |
| 2008/0177469 A1 | 7/2008 | Geelen et al. | |

FOREIGN PATENT DOCUMENTS

| | | |
|---|---|---|
| CN | 1674003 A | 9/2005 |
| CN | 1965212 A | 5/2007 |
| DE | 19742414 A1 | 4/1999 |
| EP | 1087359 A2 | 3/2001 |
| EP | 1244086 A2 | 9/2002 |
| EP | 1300654 A1 | 4/2003 |
| EP | 1530025 A2 | 5/2005 |
| JP | 9090869 A | 4/1997 |
| JP | H0990869 | 4/1997 |
| JP | 9145383 A | 6/1997 |
| JP | H09145383 | 6/1997 |
| JP | 2000097716 A | 4/2000 |
| JP | 2000111354 A | 4/2000 |
| JP | 2000180193 A | 6/2000 |
| JP | 2000337899 A | 12/2000 |
| JP | 2001084491 A | 3/2001 |
| JP | 2001227977 A | 8/2001 |
| JP | 2002213966 A | 7/2002 |
| JP | 2002340594 A | 11/2002 |
| JP | 2003315063 A | 11/2003 |
| JP | 2004132830 A | 4/2004 |
| JP | 2004361324 A | 12/2004 |
| JP | 2005003700 A | 1/2005 |
| JP | 2005077619 A | 3/2005 |
| JP | 2005227430 A | 8/2005 |
| JP | 2005265574 A | 9/2005 |
| JP | 2005291872 A | 10/2005 |
| JP | 2005292024 A | 10/2005 |
| JP | 2005308577 A | 11/2005 |
| JP | 2005339514 A | 12/2005 |
| JP | 2006052972 A | 2/2006 |
| JP | 2006126683 A | 5/2006 |
| JP | 2006145332 A | 6/2006 |
| JP | 2006201311 A | 8/2006 |
| JP | 2006259087 A | 9/2006 |
| RU | 2272255 C1 | 5/2006 |
| TW | 490571 B | 6/2002 |
| TW | 491991 B | 6/2002 |
| TW | 200509001 A | 3/2005 |
| TW | 1235309 B | 7/2005 |
| WO | 9915857 A1 | 4/1999 |
| WO | 2004112413 A1 | 12/2004 |

OTHER PUBLICATIONS

International Search Report dated Dec. 11, 2007 for International Application No. PCT/EP2007/007306.
International Search Report dated Nov. 30, 2007 for International Application No. PCT/EP2007/007307.
International Search Report dated Dec. 4, 2007 for International Application No. PCT/EP2007/007308.
International Search Report dated Dec. 19, 2007 for International Application No. PCT/EP2007/007309.
International Search Report dated Nov. 27, 2007 for International Application No. PCT/EP2007/007310.
International Search Report dated Dec. 13, 2007 for International Application No. PCT/EP2007/007311.

* cited by examiner

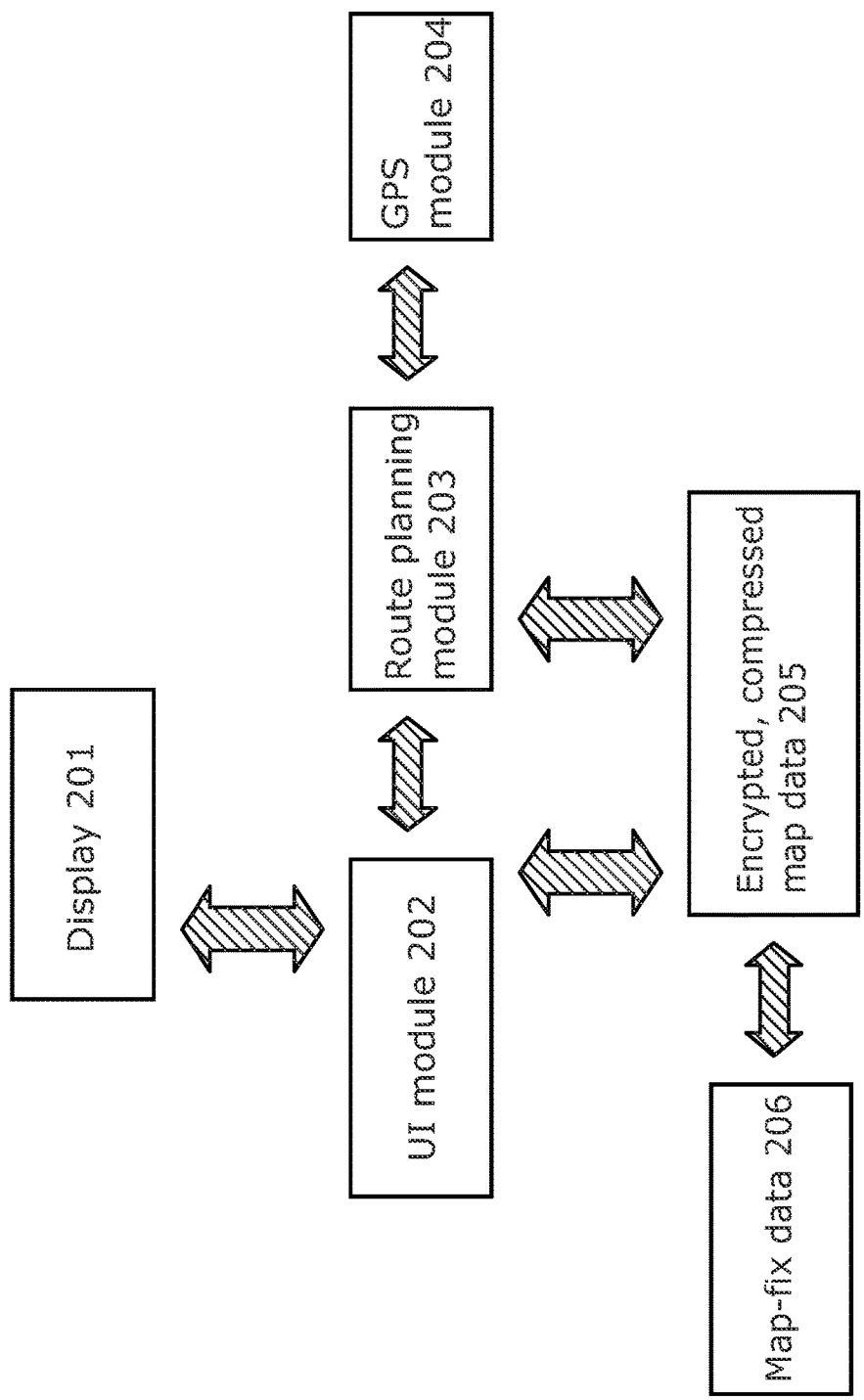

METHOD OF CREATING MAP CORRECTIONS FOR USE IN A NAVIGATION DEVICE

CROSS-REFERENCES TO RELATED APPLICATIONS

The present application is a continuation of U.S. patent application Ser. No. 11/889,711, filed on Aug. 15, 2007, which claims benefit to U.S. Provisional Patent Application Ser. No. 60/901,309 filed on Feb. 15, 2007 and United Kingdom Patent Application No. 0616211.9 filed on Aug. 15, 2006. The entire content of these applications is incorporated herein by reference.

FIELD OF THE INVENTION

This invention relates to a method of generating improved map data for use in navigation devices. Navigation devices include Global Positioning System GPS based electronic personal navigation devices.

BACKGROUND OF THE INVENTION

Map data for electronic navigation devices, such as GPS based personal navigation devices like the GO™ from TomTom International BV, comes from specialist map vendors such as Tele Atlas NV. This map data is specially designed to be used by route guidance algorithms, typically using location data from the GPS system. For example, roads can be described as lines—i.e. vectors (e.g. start point, end point, direction for a road, with an entire road being made up of many hundreds of such sections, each uniquely defined by start point/end point direction parameters). A map is then a set of such road vectors, data associated with each vector (speed limit; travel direction etc.) plus points of interest (POIs), plus road names, plus other geographic features like park boundaries, river boundaries etc, all of which are defined in terms of vectors. All map features (e.g. road vectors, POIs etc.) are typically defined in a co-ordinate system that corresponds with or relates to the GPS co-ordinate system, enabling a device's position as determined through a GPS system to be located onto the relevant road shown in a map and for an optimal route to be planned to a destination.

To construct this map database, Tele Atlas starts with basic road information from various sources, such as the Ordnance Survey for roads in England. It also has a large, dedicated team of vehicles driving on roads, plus personnel checking other maps and aerial photographs, to update and check its data. This data constitutes the core of the Tele Atlas map database. This map database is being continuously enhanced with geo-referenced data. It is then checked and published four times a year to device manufacturers like TomTom.

Despite the huge resources that go into updating and verifying these maps, the data for some geographic areas may be a year or more out of date.

In addition to the ongoing improvements described above, end-users can directly report map errors to Tele Atlas using Tele Atlas' web site. Device manufacturers like TomTom also capture and forward map error reports from their users in this way. These error reports are generally just in a free text format, so that considerable effort has to be expended in working out what the error really means and what exact location they relate to. Once verified as a real error, the appropriate correction is validated and then included in a future map release. The correction may eventually find itself in an end-user device a year or more after first being notified or, in some cases, not at all.

It is also known to store a 'trace' of a journey planned and completed using a GPS satellite navigation device (see for example the 'GPS track submission' functionality offered by ALK Technologies of Princeton, USA). This trace is a record of the complete route taken by a vehicle, using geo-coded data. The user can then send this trace data back to the device vendor; it is then used to improve the accuracy and completeness of the map database. For example, the precise position of a road or a turning may not be accurately captured on a map used by a device; the aggregated tracks for people taking that road or turning will enable a more accurate position to be determined; future map releases by the device vendor can incorporate the correction.

Reference may also be made to collaborative mapping projects, frequently called 'wikimaps'. Wikimaps do not however generate 'map data' as we define that term—i.e. map data that is suitable for route guidance algorithms to plot a route on a road system to a destination.

SUMMARY OF THE INVENTION

The invention is a method of creating and storing map alterations on a navigation device, the method comprising the steps of:
  loading a map;
  providing menu driven selection of possible alterations;
  receiving input comprising at least one of said alterations;
  implementing said at least one of said alterations; and
  storing said at least one of said alterations on said device.
  Hence, it is no longer necessary for an end-user to be restricted to reporting errors to the map vendor over a web link, then waiting for that map vendor to verify the error, update its maps and supply the update—a cycle that can take months and sometimes years to complete. Instead, the navigation device can use the correction without external processing—e.g. verification by the map vendor. Use of the correction by the device can, in relative terms, be 'immediate'. The term 'immediate' should not be construed as instantaneously, but as simply meaning soon after the correction has been input. There can be intervening steps, such as the user verifying that the correction should be used, turning the device on and then off etc.

In an implementation, there is a navigation device that allows users to make modifications to the map data stored on their device. The navigation device can be a portable stand-alone GPS navigation device with route guidance capability, such as the GO series device from TomTom International BV, or any other kind of portable information device, such as a mobile telephone or PDA. But equally, it could be a device integrated into a vehicle, or a computing device such as a static desktop PC (including a laptop) running navigation software (which term includes mapping software which does not actually deliver dynamic route guidance but instead simply mapping—where the user is. Also, the navigation software could run locally on the client device or run on a server remote from the client device). The PC can then dock with a portable navigation device with a route guidance capability and transfer the corrections to the portable navigation device.

Typical features of such a navigation device are:
  A user interface allowing users to create corrections to a digitally stored map;
  A user interface that allows users to include or exclude map corrections from route calculations;

A user interface that allows user to view their corrected map data on the digital map A set of correction categories that allow users to associate map corrections with one or more transportation types;

The ability to share map corrections with other users, for example via a content aggregation service. Shared maps are available for use (e.g. by a route planning algorithm or map display engine) as soon as they are downloaded.

BRIEF DESCRIPTION OF THE DRAWINGS

The present invention will be described with reference to the accompanying drawings, in which:

FIG. 2 is a diagram of the core software modules deployed in a navigation device implementing the invention;

DETAILED DESCRIPTION OF PREFERRED EMBODIMENTS

The present invention will be described with reference to an implementation of a map data correction tool that allows users to fix and also to share and report map errors using personal navigation devices. The user enters the correction (or map fix) into the navigation device. The map fix is then applied locally in the device to supplement the map data used by the device in routing and displaying roads, POIs etc. The map fix is immediately available. The map fix can be reported to a remote server by the device in a number of ways: the device may have an integral communications capability (e.g. wireless cellular system that can send data to the server), may be able to send data over a short range wireless link to a mobile telephone which in turn sends the data to the server, may be able to dock with an internet connected PC that can communicate with the server, or may itself be that internet connected PC. The server might aggregate all corrections from all users, validate corrections, and distribute the corrections to other users, and share the corrections with one or more map vendors.

When fully implemented, this feedback could replace map vendor updates as the primary mechanism for updating map data in navigation products.

The scope of one implementation of the map data correction tool is to provide user friendly, on-device tools allowing the user to:

Block and un-block streets on their map;
Modify the traffic direction of streets on their map;
Add and modify street names on their map;
Modify speed limits of roads on their map.

Hence, the corrections directly affect how the routing calculation algorithms operate—i.e. they are used when calculating a route to a destination. The map data correction tool also allows the user to:

Add safety camera locations to the map;
Share map corrections with other users;
Download map corrections from other users;
Create map error reports for large errors.

In addition to on-device corrections, the same correction features for all the above correction types can be made available using a desktop computer application that is capable of connecting to the device, e.g. in order to store corrections.

In addition to on-device features, improvements are possible to existing web based map error reporting tools:

Map error reporting can be made easier on the support website of the manufacturer of the navigation device;
Map error reporting tools might be added to an application running on the users PC;
Users might receive feedback on the map errors that they have reported;
Errors may be prioritised before sending them to the map supplier, e.g. TeleAtlas.

As explained earlier, important features of the map data correction tool are:

Map corrections and error reporting is possible on the navigation device or an application running on the user's PC;
Corrections take immediate effect (e.g. those meeting user-defined criteria);
Users may exchange corrections with other users.

Figure 1A:
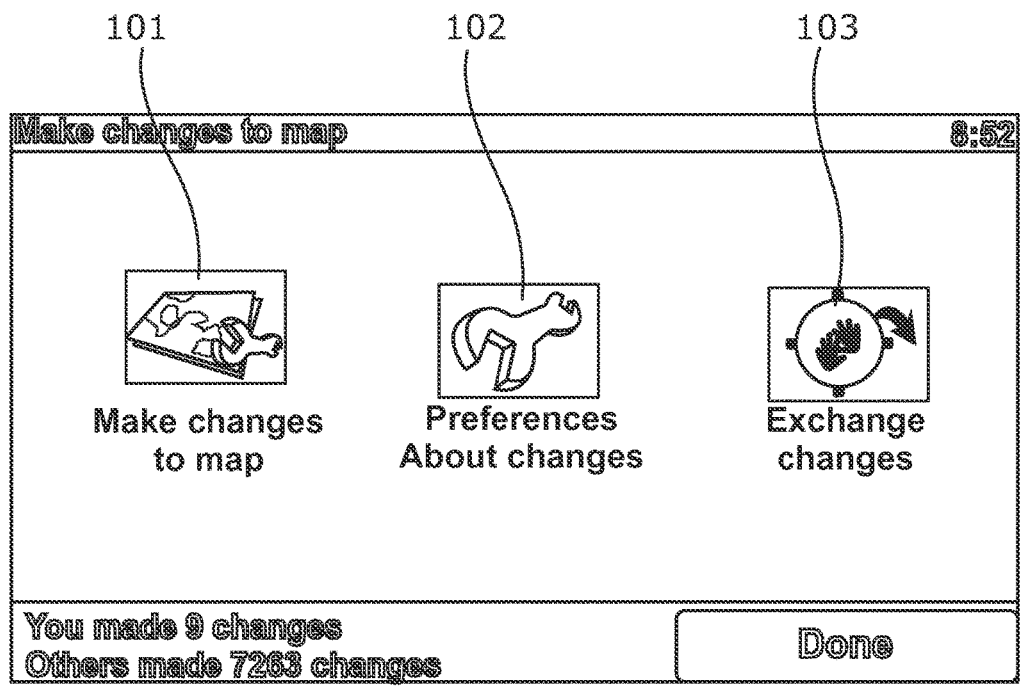
FIG. 1A is the main error reporting screen displayed by a navigation device.

On a navigation device, this can be implemented by the device displaying a menu item 'Make changes to the map' 101, as shown in FIG. 1A. The consequences of selecting this item are discussed below. There are 2 further menu items that will be described first.

First, the menu item 'Exchange Changes' 103 allows the user to initiate an upload of the user's own changes, and download other people's changes to the device. Upload can be via a mobile telephone with a GPRS wireless link that links to the navigation device over a Bluetooth network or via an Internet connected PC that the device is docked with.

Secondly, the menu item 'Preferences About changes' 102 determines which changes to enable. Selecting this item can cause the device to display a menu screen or similar, e.g. with check boxes to indicate applicable types of changes to enable and disable. For example, the user may select to enable/disable any of the following:

own changes;
recent changes;
last year's changes;
changes made on other maps;
only if reported more than once;
only from trusted sources.

The navigation device might display the total number of available changes and also the number of changes enabled (selected for download) by the user based on the current preferences.

Figure 1B:
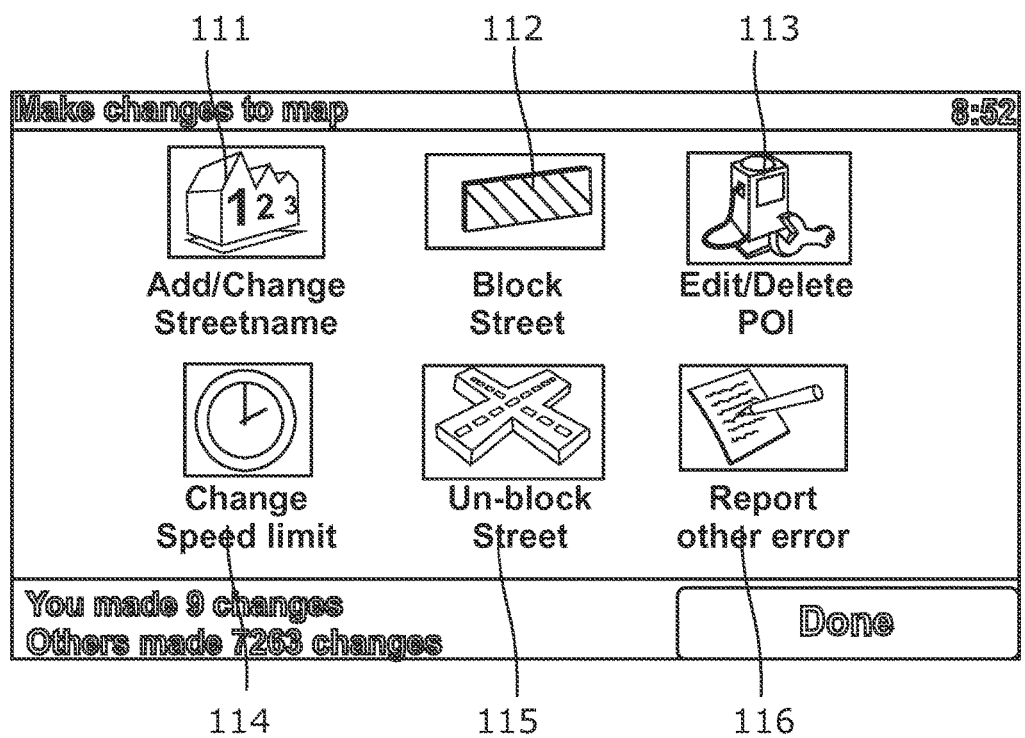
FIG. 1B is the screen shown that allows users to define the type of error they wish to capture and report.

The 'Make changes to map' 101 icon might take the user to a submenu which offers options to change the map instantly—plus the option to report an error (if it is not covered by self-action). These include, as shown in FIG. 1B:

Add/change street name 111: if a user selects this, then the device may, for example, display a list of names of streets currently being displayed by the map (or that would be displayed if the device were in the normal navigation mode); the user might select the street to be re-named and then enter the new name via an on-screen keyboard.

Block Street 112: if a user selects this, then the device may, for example, display a list of names of streets currently being displayed by the map (or that would be displayed if the device were in the normal navigation mode); the user might select the street to be blocked.

Change traffic direction (not shown): if a user selects this, then the device may, for example, display a list of names of streets currently being displayed by the map (or that would be displayed if the device were in the normal navigation mode) together with the traffic direction; the user might select the street whose traffic direction is to be altered.

Change speed limit 114: if a user selects this, then the device may, for example, display a list of names of streets currently being displayed by the map (or that would be displayed if the device were in the normal navigation mode) together with applicable speed limits; the user might select the street whose speed limit is to be altered and then select the appropriate new speed limit from a menu.

Un-block street 115: if a user selects this, then the device may, for example, display a list of names of blocked streets currently being displayed by the map (or that would be displayed if the device were in the normal navigation mode); the user might select the street to be unblocked.

In addition, it is possible, selecting the 'Edit/delete POI' 113 icon to open a sub-menu with graphical options for the following corrections:

Rename a POI;
Move a POI;
Add a POI to a category;
Delete a POI;
Re-categorize a POI.

In each case, the device may, for example, display a list of names of POIs currently being displayed by the map (or that would be displayed if the device were in the normal navigation mode); the user might select the relevant POI and then edit or delete that POI. These POIs are typically those supplied by the map vendor but can include POIs downloaded by the user (e.g. speed cameras).

A further menu item is to 'Report other error' 116, which enables complaints, missing roads etc. to be reported. It allows the user to pick a location, select from a list of typical issues, allow user to add free text commentary etc.

Figure 1C:
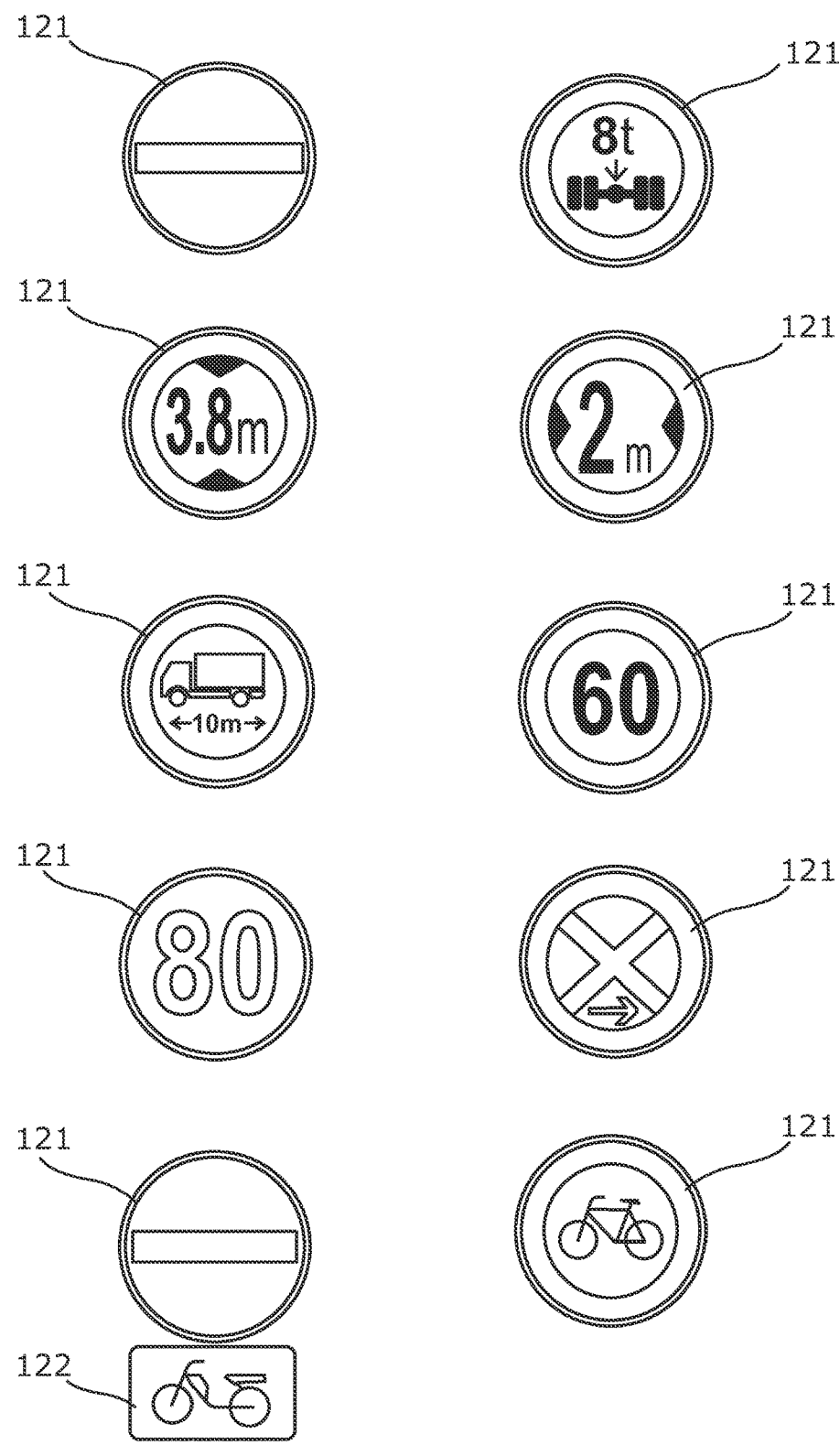
FIG. 1C is an illustration of a set of symbols that can be used in one implementation of the invention.

FIG. 1C illustrates some examples of international traffic signs 121 that might be used in one embodiment of the invention. Traffic signs or road signs are signage posted at the side of the roads to impart information to road users. International signs using symbols instead of words have been developed and adopted in most countries to facilitate international road traffic and to increase road safety. Traffic signs might be danger warnings, priority signs, prohibitory or restrictive signs, mandatory signs, special regulation signs, information, facilities, service, direction, position, indication signs, or additional panels such as those defined in the Vienna Convention on Road Signs and Signals. In some countries, they are referred to as signpost information. The terms traffic signs, road signs or signpost information as used here are meant to include any graphical symbols relating to road traffic, rules, identification of road objects or their location, such as road markings, lane information, zebra stripes for pedestrian crossing, street names, house numbers, brand names, logos and the like.

Figure 1D:
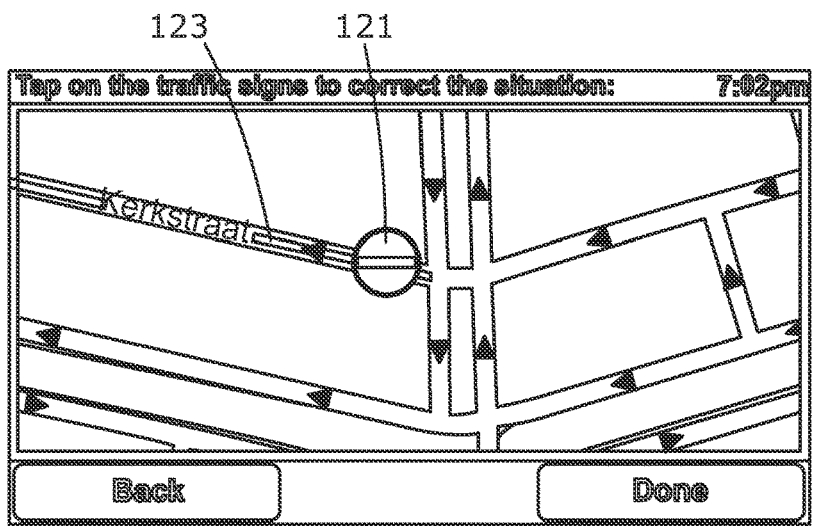
FIG. 1D is a screenshot of an international traffic sign placed on the map display of the navigation device.

As shown in FIG. 1D, the user might provide information about locations, traffic rules, traffic directions and other map related data by placing international traffic signs 121 on the map on the navigation device. In this example, the user might place the "no entry" traffic sign 121 on the entrance (i.e. near one corner) of a street or road 123 to indicate the road can not be entered by cars from that end.

Figure 1E:
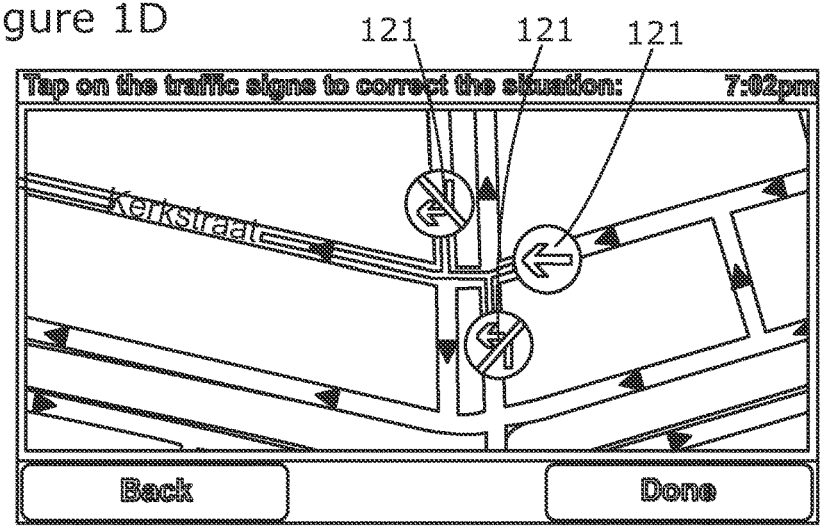
FIG. 1E is a screenshot showing further international traffic signs placed on the map display of the navigation device.

FIG. 1E is another example of the invention, according to which, the user might place other prohibitory signs 121 such as a "no right turn" or "no left turn" signs on a street near the corner, indicating turn restrictions.

The user might place a "max tonnage" traffic sign 121 on a road or bridge to indicate cars or trucks above that weight can not travel across it. Height or width restrictions might be indicated in a similar fashion.

The user might place a "max 60 kph" or "minimum 80 kph" traffic sign on a road to indicate a speed limit for that road or for a portion of a road.

The user might also provide parking information. The signs might not match real-world signs. Signs might indicate that parking is not possible in a street, because it is either forbidden or simply there are no parking spots. The sign might simply indicate that drivers can not park there, rather than that it is not allowed to park there.

Correction of map related data is also possible on a PC, e.g. using a web browser or a mapping application. The user may place international traffic signs 121 on the map in a similar manner as on a navigation device regardless whether the navigation device is connected to the pc or not.

The user might place a traffic sign 121 on the map on the place where that same sign is posted in the real world. Regardless whether these signs are there in the real world or not, or where are they located exactly, the navigation device may display information about streets or traffic restrictions using these international traffic signs 121 to explain the situation graphically.

Traffic signs 121 are particularly appropriate for this purpose because
 they are international;
 they are well-known;
 they are suited to specify information about roads;
 placing a particular sign on a map in the same location the sign exists in the real world will have exactly the desired effect.

The signs placed on the map might be used for various modes of transport, including cars, bicycles, motorists, trucks, taxis. The user might specify a transport mode, for which the entered map correction is valid, e.g. every sign entered is related to bicycles only as illustrated using item 122 on FIG. 1C. Alternatively, map corrections might be valid for all modes of transport, and restrictions (or exemptions) for a certain mode of transport might be indicated separately.

The user selects the 'Make changes to map' menu 101 as described above, then selects what kind of correction to make and using which traffic sign. Either at this phase or earlier, the user selects the location where the change should take effect. The traffic sign 121, i.e. the "do not enter" sign 121 in this example, is placed on the map by clicking at the appropriate area, for example at the entrance of a road or street 123. The user might also drag the traffic sign icon to the appropriate location or might correct the location by clicking and dragging the traffic sign icon 121 on the map. The user might change the direction of a one-way street by moving the "no entry" sign 121 from one end of the street to the other one. The moving of the traffic sign 121 might be performed by clicking and dragging the icon or a similar action, e.g. by re-centering the screen. To place and to drag traffic sign icons 121 on the map, the touchscreen of the navigation device might be used. In other implementations, appropriate hard or soft-buttons might be used as well, such as arrow buttons (up, down, left, right) on the navigation device or a numerical input for entering the co-ordinates. Various other input peripherals might be used, such as a mouse and a keyboard of a personal computer.

Figure 1F:
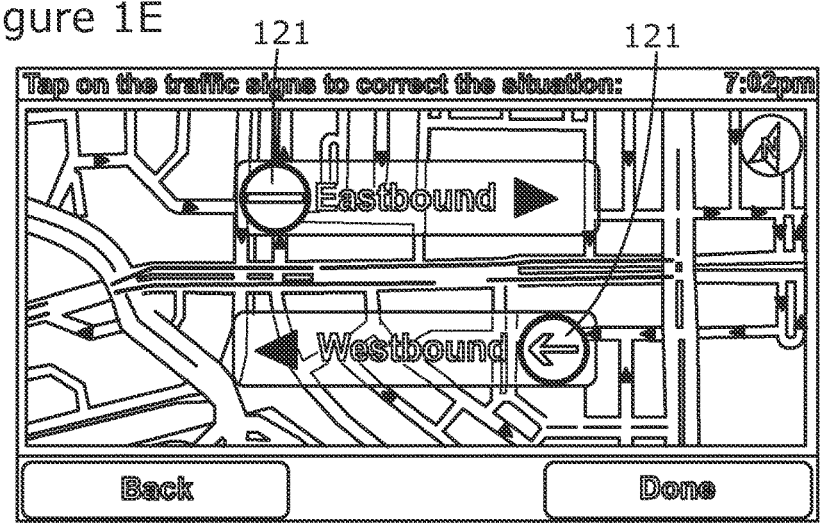
FIG. 1F is a screenshot showing another embodiment using international traffic signs on map display of the navigation device.

In another embodiment, traffic signs 121 might be used in general to display information about roads and streets. Traffic signs 121 on their own, or in combination with appropriate text labels, might be used to give visual feedback about traffic rules and restrictions as shown in FIG. 1F. Similarly, other types of graphical objects (not shown) might be placed on the map by the user in order to convey information about map items and locations. The user of the navigation device might place icons representing traffic lights or pedestrian crossings on the map to show or update real-life location of these objects.

It is possible that users place identification of businesses such as logos, brand names on the map to identify those businesses on the map as opposed to indicating traffic rules.
Other Features

- Users might create "private" fixes for their map and "shared" fixes that are also sent to a remote server for aggregation;
- Each map fix is stored independently;
- Map fixes are highly compressible for OTA distribution;
- Map fixes are secure (such that it is not possible to manually reverse engineer the format) to ensure that unauthorized users and devices cannot use map data corrections;
- Map fixes are stored in a map-independent form so that they can be preserved during map upgrades and they can be applied to maps from different vendors;
- Map fixes might be automatically removed if the area related to the fix has changed in a new release of the map data (if the map error has been fixed by the map supplier);
- Preferably, map fixes do not permanently modify the user's map data;
- Users might choose which kinds of changes they use (e.g. use only own changes or use own changes and those from other sources);
- User might choose from which other sources they accept map changes;
- Map fixes might be associated with a map version and map supplier;
- It is possible to maintain map fix databases for each released map version;
- Users with new maps might receive fixes reported on older and current map versions
- Users of old maps might not be able to receive fixes reported on newer maps;
- An aggregation system might be used to collect and share map corrections and reports with other users;
- The aggregation system might serve as a tool to add reliability so that the validity or credibility of map fixes and reports can be assessed;
- Users who report good errors on a regular basis may become "trusted", and their fixes might be offered to all users without validation;
- These "trusted" users may also validate fixes submitted by other users;
- The manufacturer of a navigation device might endorse validated fixes sent by users.

FIG. 2 shows schematically the core software modules deployed in a navigation device implementing the invention. The display 201 is a touch screen display that the user enters a destination address into in the conventional manner. That address data input is handled by the UI module 202 and sent to the navigation/route planning module 203. Route planning module 203, taking a GPS feed from GPS module 204, plans a route using map data from the encrypted, compressed map data 205 that the device was shipped with (or was otherwise supplied from the map vendor, such as Tele Atlas). The present invention is then implemented as follows: the user enters a map correction as and when needed, using a touch screen interaction, touching large graphical icons, as exemplified by FIGS. 1A and 1B, into display 201. The UI module 202 captures the map fix and sends it to a map fix store 206. As soon as the map fix is in the map fix 206 store, it is made available to the route planning module 202 and the UI module 202. If the map fix requires re-planning of even the current route being driven, then that will happen automatically (if the user configures that option). For example, the device might plan a route that requires the user to turn into a street: when the turning is approached, the user finds that it has recently been made a 'no entry' street. The user can enter an appropriate map correction: a new route, taking into account the no entry street, is then immediately planned and appropriate route guidance given. Likewise, if the user plans a completely new route to another destination, the new route will also take the map fix into account. If the map fix should affect how the map should appear (for example, re-naming a road, showing a new POI, such as a speed camera), then that new appearance will be immediately present. Automatic use of the correction is not mandatory though; some users may prefer for route calculation etc. to exclude map corrections.

The following is a description of a typical device that can implement the present invention.

The present invention can be implemented in an integrated navigation device from TomTom International B.V. called GO. GO deploys navigation software called Navigator (or Navcore) and has an internal GPS receiver; Navigator software can also run on a touch screen (i.e. stylus controlled) Pocket PC powered PDA device, such as the Compaq iPaq. It then provides a GPS based navigation system when the PDA is coupled with a GPS receiver. The combined PDA and GPS receiver system is designed to be used as an in-vehicle navigation system.

The invention may also be implemented in any other arrangement of navigation device, such as one with an integral GPS receiver/computer/display, or a device designed for non-vehicle use (e.g. for walkers) or vehicles other than cars (e.g. aircraft). The navigation device may implement any kind of position sensing technology and is not limited to GPS; it can hence be implemented using other kinds of GNSS (global navigation satellite system) such as the European Galileo system. Equally, it is not limited to satellite based location/velocity systems but can be deployed using ground-based beacons or any other kind of system that enables the device to determine its geographic location.

Figure 3:
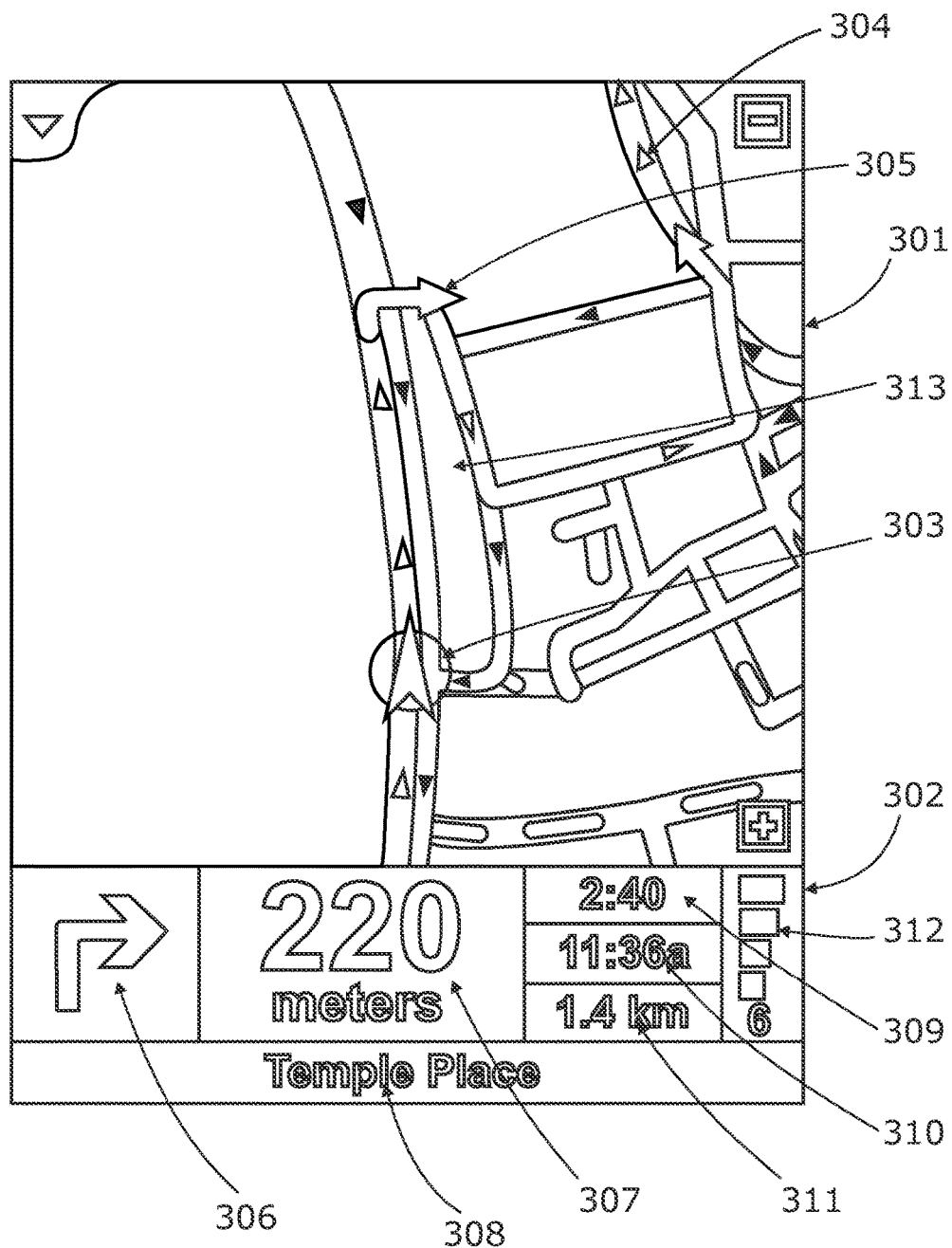
FIG. 3 is a screen shot from a navigation device implementing the present invention; the screen shot shows a plan map view and a status bar running along the bottom of the display.

When in use, a navigation device (or a navigation software running on a PDA) displays the normal navigation mode screen shown in FIG. 3. This view provides driving instructions using a combination of text, symbols, voice guidance and a moving map. Key user interface elements are the following: a two dimensional map 301 occupies most of the screen. The map shows the user's car and its immediate surroundings, rotated in such a way that the direction in which the car is moving is always "up". Running across the bottom quarter of the screen is the status bar 302. The current location of the device, as the device itself determines using conventional GPS location finding and its orientation (as inferred from its direction of travel) is depicted by an arrow 303. The route calculated by the device (using route calculation algorithms stored in device memory as applied to map data stored in a map database in device memory) is shown as darkened path 304 superimposed with arrows giving the travel direction. On the darkened path 304, all major actions (e.g. turning corners, crossroads, roundabouts etc.) are schematically depicted by arrows 305 overlaying the path 304. The status bar 302 also includes at its left hand side a schematic 306 depicting the next action (here, a right turn). The status bar 302 also shows the distance 307 to the next action (i.e. the right turn—here the distance is 220 meters) as extracted from a database of the entire route calculated by the device (i.e. a list of all roads and related actions defining the route to be taken). Status bar 302 also shows the name of the current road 308, the estimated time before arrival 309 (here 2 minutes and 40 seconds), the actual estimated arrival time 310 (11.36 am) and the distance to the destination 311 (1.4 Km). The GPS signal strength is shown in a mobile-phone style signal strength indicator 312.

Figure 4:
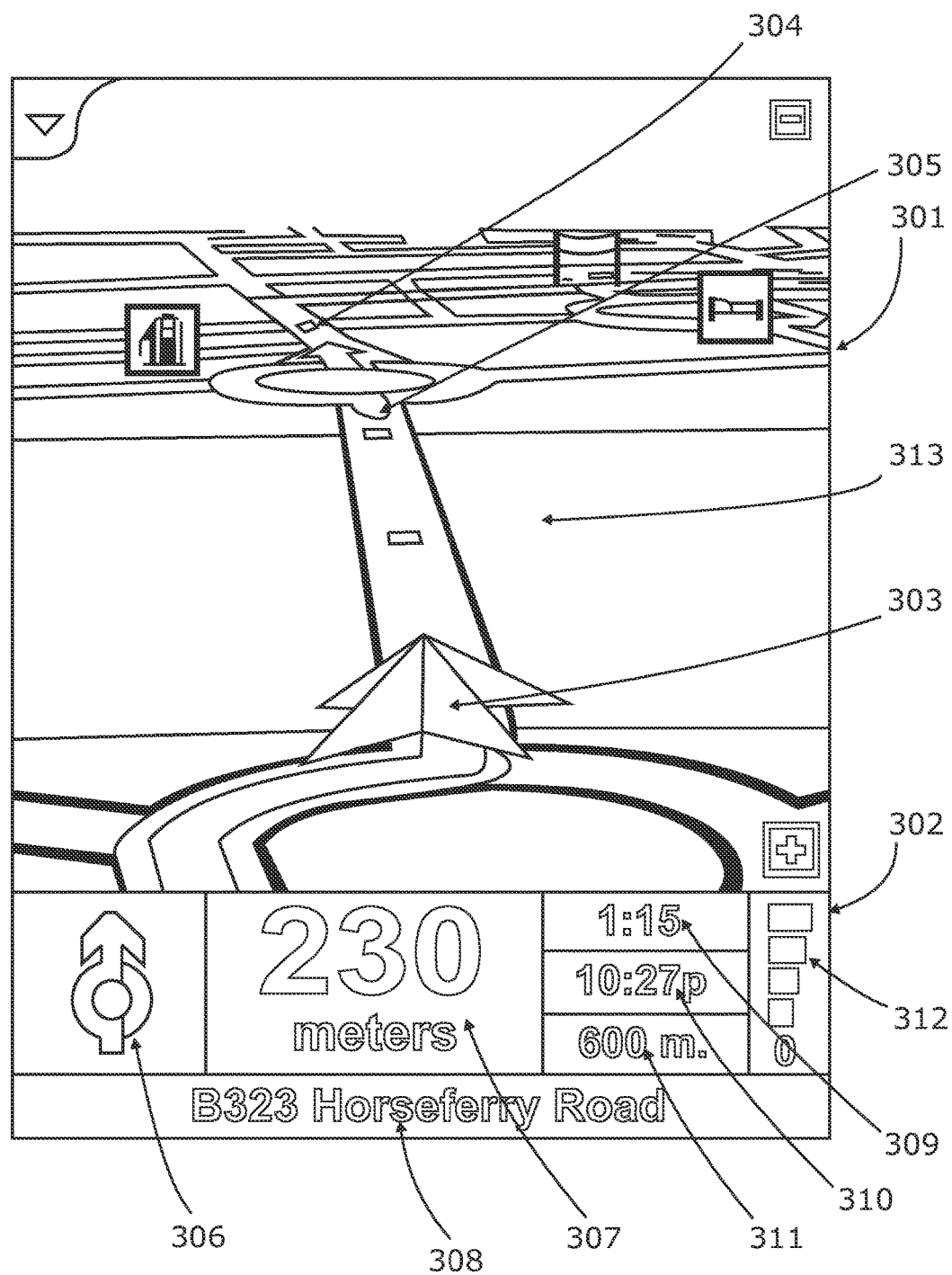
FIG. 4 is a screen shot from a navigation device implementing a 3-D view.

FIG. 4 is a three dimensional view of the navigation mode screen illustrating the same objects as discussed above with regards to FIG. 3 using the same reference numbers.

If the user touches the screen 313, then a navigation screen main menu (not shown) is displayed; from this menu, other core navigation functions within the Navigator application can be initiated or controlled. Allowing core navigation functions to be selected from a menu screen that is itself very readily called up (e.g. one step away from the map display to the menu screen) greatly simplifies the user interaction and makes it faster and easier.

Figure 5:
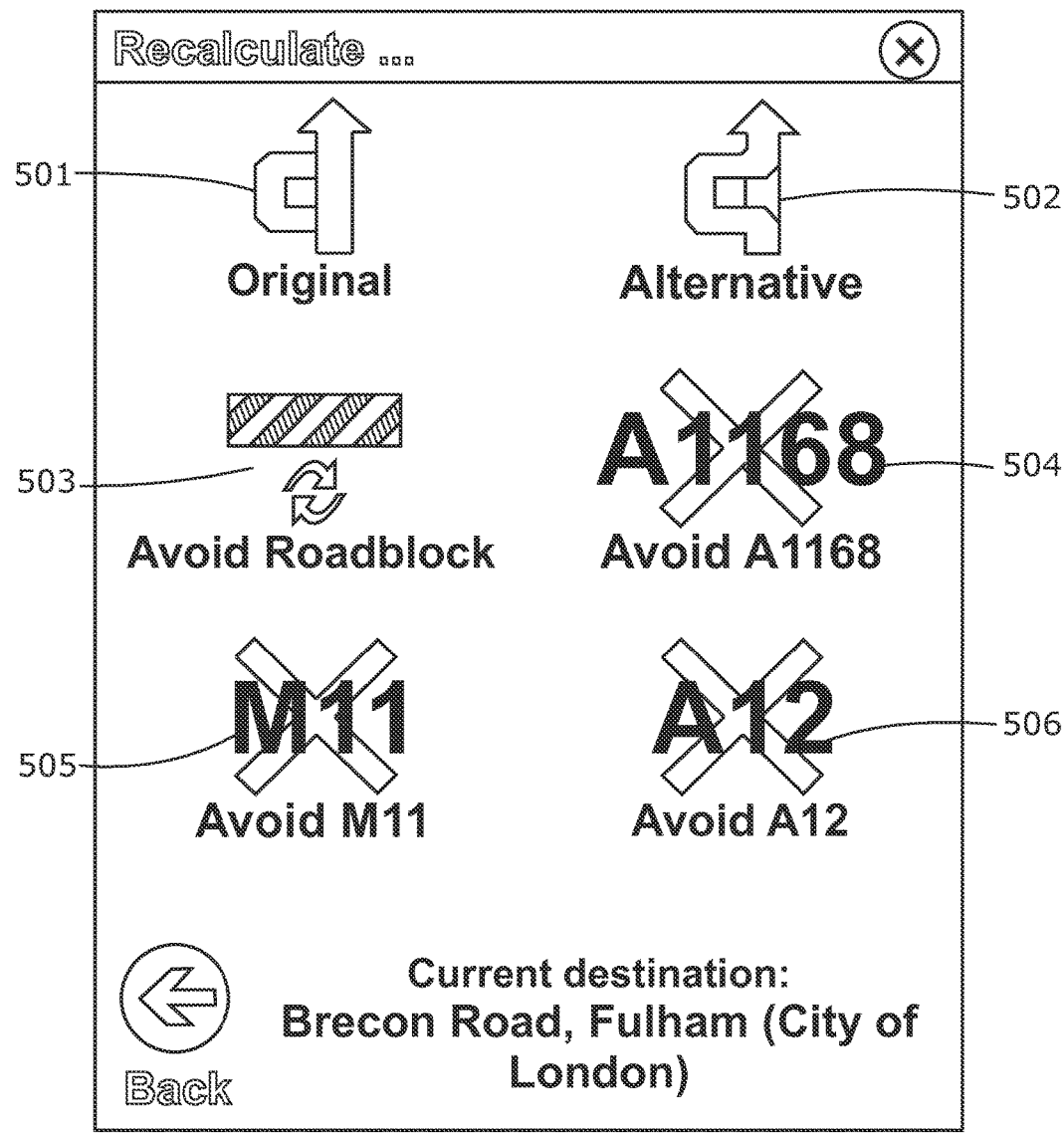
FIG. 5 is a screen shot from a navigation device showing a navigation menu.

The area of the touch zone which needs to be touched by a user is far larger than in most stylus based touch screen systems. It is designed to be large enough to be reliably selected by a single finger without special accuracy; i.e. to mimic the real-life conditions for a driver when controlling a vehicle; he or she will have little time to look at a highly detailed screen with small control icons, and still less time to accurately press one of those small control icons. Hence, using a very large touch screen area associated with a given soft key (or hidden soft key, as in the centre of the screen 313) is a deliberate design feature of this implementation. Unlike other stylus based applications, this design feature is consistently deployed throughout Navigator to select core functions that are likely to be needed by a driver whilst actually driving. Hence, whenever the user is given the choice of selecting on-screen icons (e.g. control icons, or keys of a virtual keyboard to enter a destination address, for example), then the design of those icons/keys is kept simple and the associated touch screen zones is expanded to such a size that each icon/key can unambiguously be finger selected. In practice, the associated touch screen zone will be of the order of at least 0.7 cm$^2$ and will typically be a square zone. In normal navigation mode, the device displays a map. Touching the map (i.e. the touch sensitive display) once (or twice in a different implementation) near to the screen centre (or any part of the screen in another implementation) will then call up either directly (i.e. the next level down) or indirectly (i.e. two or more levels down) a navigation menu (see FIG. 5) with large icons corresponding to various navigation functions 501-506, such as the option to calculate an alternative route 502, and re-calculate the route so as to avoid the next section of road 503 (useful when faced with an obstruction or heavy congestion); or recalculate the route so as to avoid specific, listed roads 504-506.

The actual physical structure of the device is fundamentally different from a conventional embedded device in terms of the memory architecture (see system Architecture section below). At a high level it is similar though: memory stores the route calculation algorithms, map database and user interface software; a microprocessor interprets and processes user input (e.g. using a device touch screen to input the start and destination addresses and all other control inputs) and deploys the route calculation algorithms to calculate the optimal route. 'Optimal' may refer to criteria such as shortest time or shortest distance, or some other user-related factors.

More specifically, the user inputs his start position and required destination in the normal manner into the Navigator software running on the PDA using a virtual keyboard. The user then selects the manner in which a travel route is calculated: various modes are offered, such as a 'fast' mode that calculates the route very rapidly, but the route might not be the shortest; a 'full' mode that looks at all possible routes and locates the shortest, but takes longer to calculate etc. Other options are possible, with a user defining a route that is scenic—e.g. passes the most POI (points of interest) marked as views of outstanding beauty, or passes the most POIs of possible interest to children or uses the fewest junctions etc.

Roads themselves are described in the map database that is part of Navigator (or is otherwise accessed by it) running on the PDA as lines—i.e. vectors (e.g. start point, end point, direction for a road, with an entire road being made up of many hundreds of such sections, each uniquely defined by start point/end point direction parameters). A map is then a set of such road vectors, plus points of interest (POIs), plus road names, plus other geographic features like park boundaries, river boundaries etc, all of which are defined in terms of vectors. All map features (e.g. road vectors, POIs etc.) are defined in a co-ordinate system that corresponds or relates to the GPS co-ordinate system, enabling a device's position as determined through a GPS system to be located onto the relevant road shown in a map.

Route calculation uses complex algorithms that are part of the Navigator software. The algorithms are applied to score large numbers of potential different routes. The Navigator software then evaluates them against the user defined criteria (or device defaults), such as a full mode scan, with scenic route, past museums, and no speed camera. The route which best meets the defined criteria is then calculated by a processor in the PDA and then stored in a database in RAM as a sequence of vectors, road names and actions to be done at vector end-points (e.g. corresponding to pre-determined distances along each road of the route, such as after 100 meters, turn left into street x).

Figure 6:
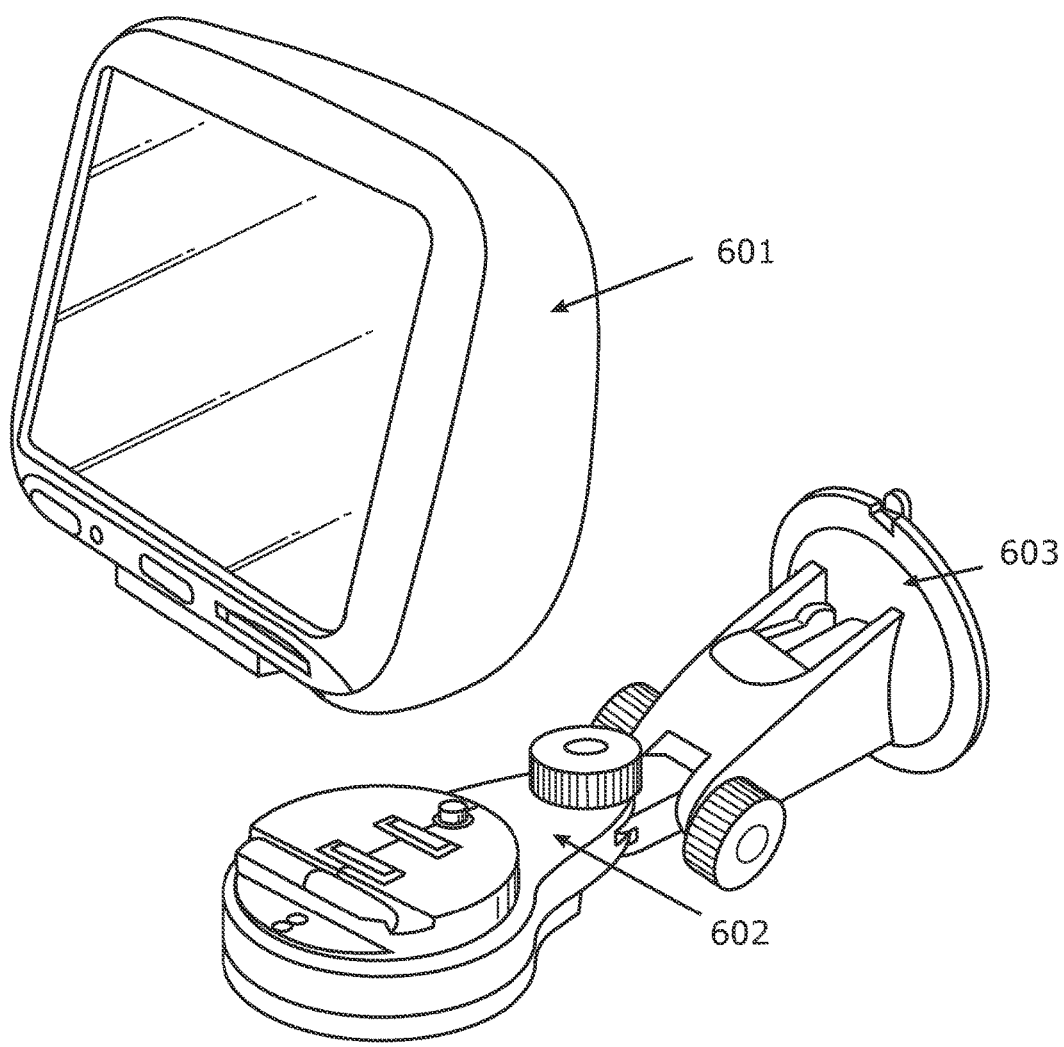
FIG. 6 is a perspective view of a navigation device.

FIG. 6 is a perspective view of an example of a navigation device 601. The navigation device 601 is a unit that includes display, internal GPS receiver, microprocessor, power supply and memory systems (not shown). The device may sit on an arm 602, which itself is secured to the car dashboard using a suction cup 603. The navigation device 601 may also be docked onto the dashboard of the vehicle.

Figure 7:
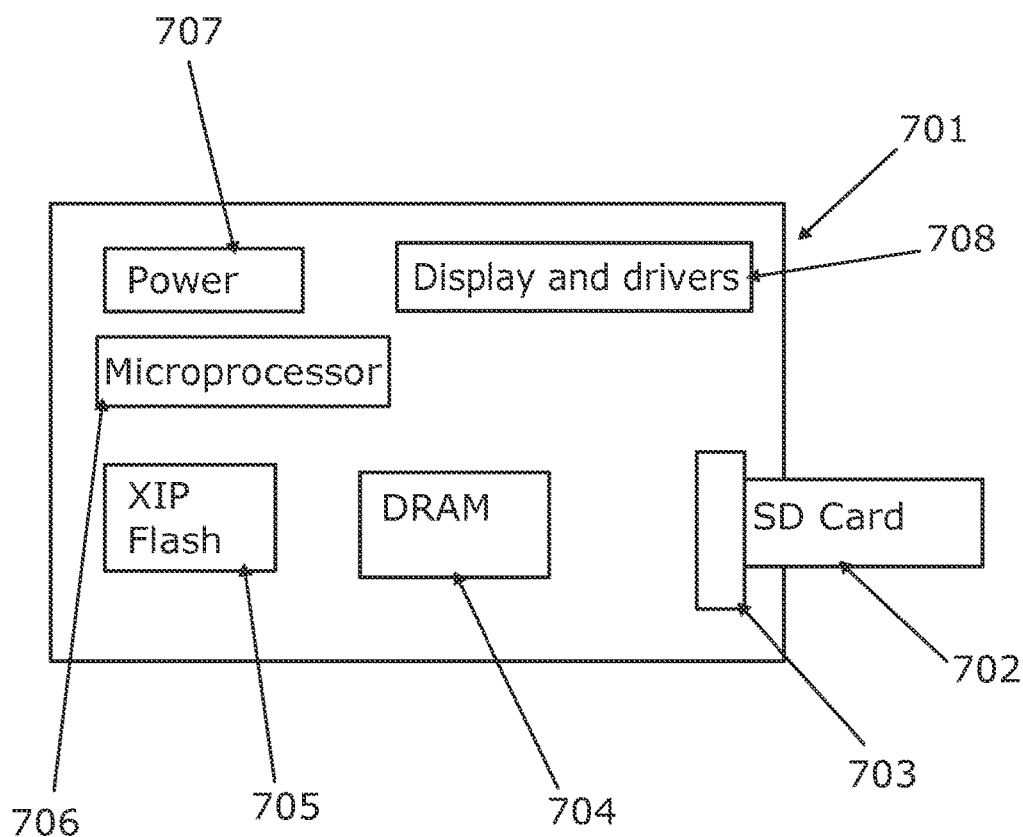
FIG. 7 is a schematic view of the system architecture for a navigation device.

In contrast to conventional embedded devices which execute all the operating system and application code in place from a large mask read only memory ROM or Flash memory device, an implementation of the present invention might use a memory architecture as illustrated in FIG. 7. The device, indicated generally at 701, includes conventional items such as a microprocessor 706, power source 707, display and related drivers 708. In addition, it includes a secure digital SD card reader 703; a SD card 702 is shown slotted into position. The device 701 might have internal dynamic random access memory DRAM 704 and XIP (eXecute In Place) Flash 705 as well.

The device hence may use three different forms of memory:
1. A small amount of internal XIP Flash ROM 705. This is analogous to the PC's BIOS ROM and will only contain a proprietary boot loader, $E^2$ emulation (for UID and manufacturing data) and splash screen bit maps. This is estimated to be 256 KB in size and would be on a slow 8 bit wide SRAM interface.
2. The main system RAM (or DRAM) memory 704, this is analogous to the PC's main memory (RAM). This will be where all the main code executes from as well as providing the video RAM and workspace for the OS and applications. Note: No persistent user data will be stored in the main system RAM (like a PC) i.e. there will be no "Ram drive". This RAM will be exclusively connected to a 32 bit 100 MHz synchronous high-speed bus.
3. Non-volatile storage, analogous to the PC's hard disk might be implemented as removable flash based SD cards 702. All the operating system, applications, settings files and map data might be permanently stored on SD cards.

Figure 8:
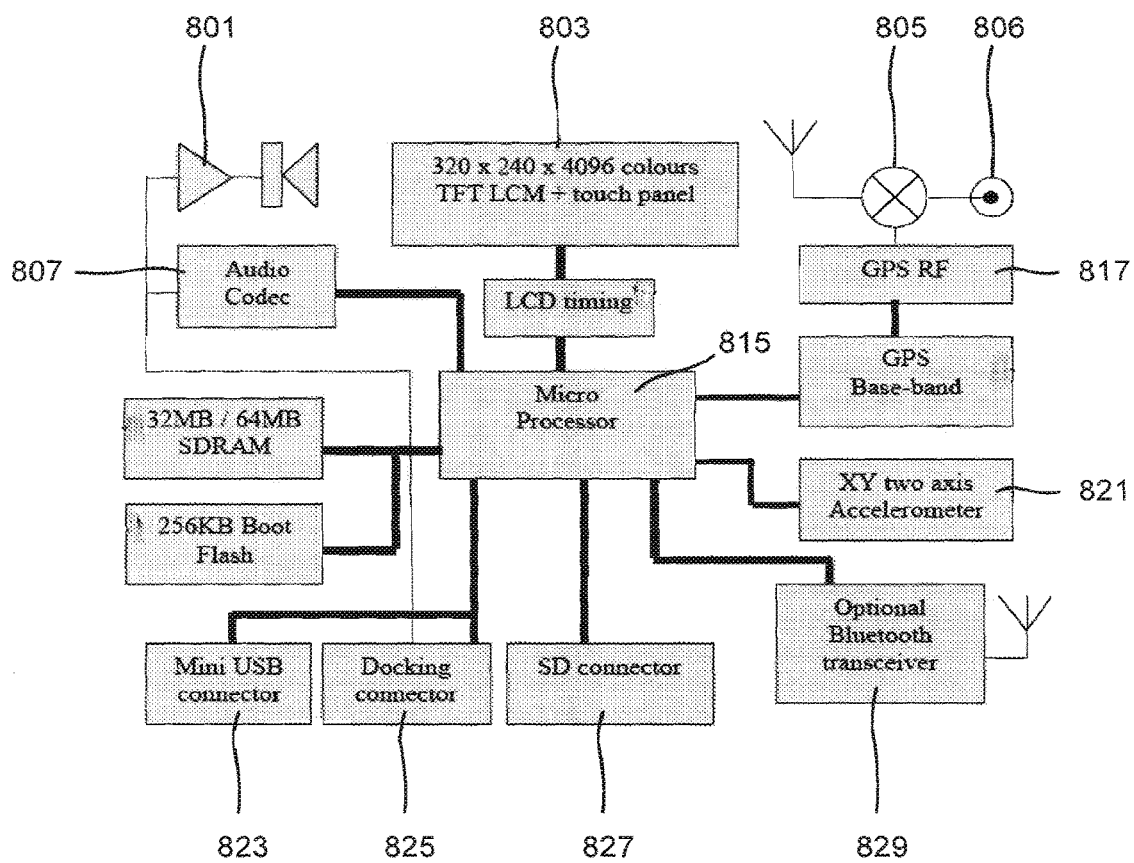
FIG. 8 is a block diagram of components in a navigation device.
Figure 9:
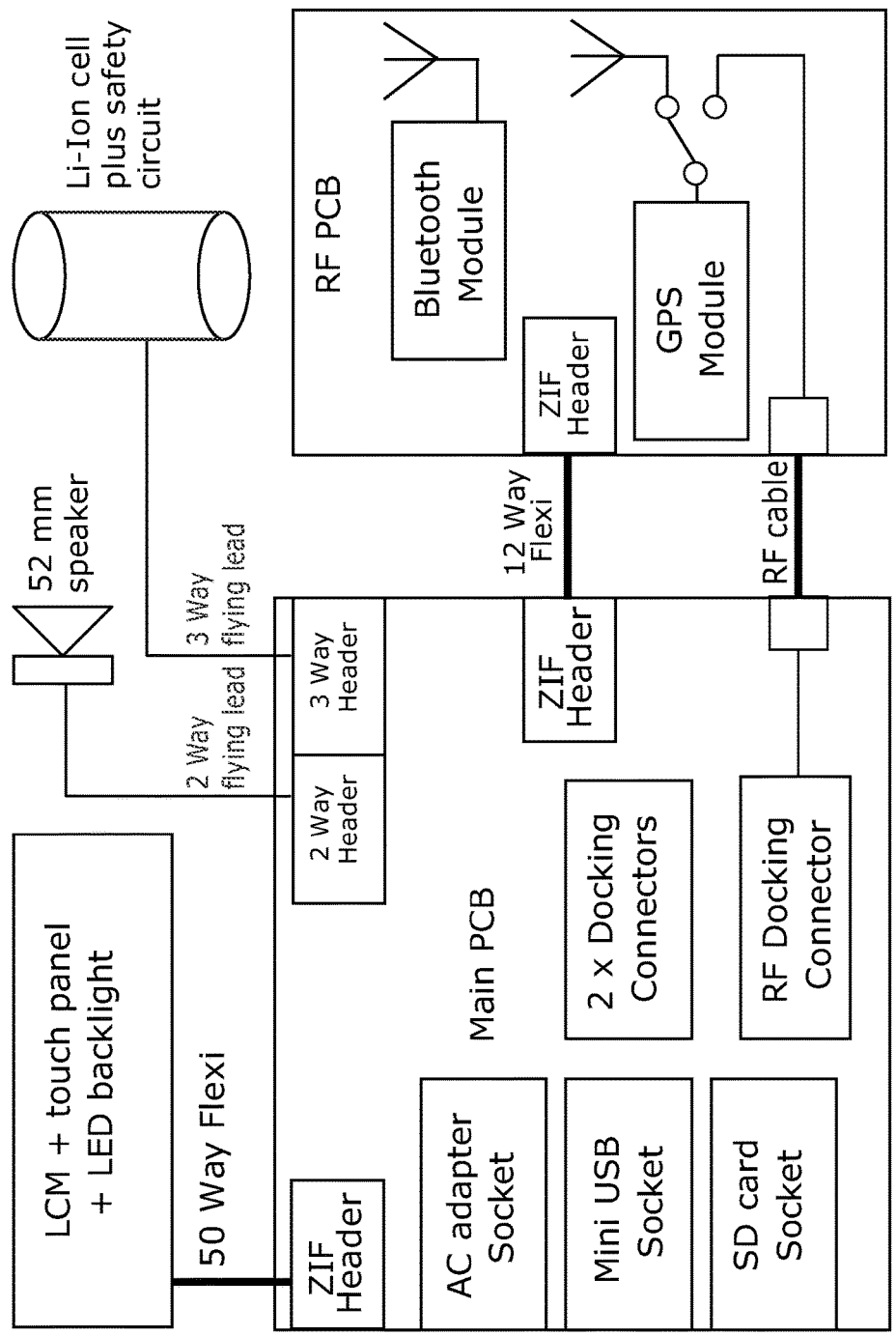
FIG. 9 is a diagram of the electrical subassemblies in the FIG. 8 navigation device.

FIG. 8 is a block diagram illustrating some typical components of a navigation device implementing the invention.

A navigation device may be built on standard commodity components.

The navigation device might use a transflective 3.5" thin film transistor TFT backlit display 803 that might be a 'standard' ¼ video graphics array VGA display. It might also contain an integrated touch panel and backlight. The display 803 mounted in landscape, or in some cases, in portrait orientation.

The navigation device might comprise a highly integrated processor CPU 815, an SD card memory slot 827 for application and map data storage, integrated GPS receiver 817 and antenna 805, integrated two axis accelerometer 821 for simple dead reckoning, power supply (not shown), and external GPS antenna connection 806. The navigation device may use a customized version of an embedded Linux OS without GUI layer as the navigation application provides its own UI. The navigation device may comprise a very simple touch screen UI optimised for finger use and a high quality integrated speaker 801 for voice instructions.

The navigation device may have an internal rechargeable battery (not shown) and it may operate independently from any connection to a vehicle. The battery might be charged, and the device powered (even if the battery contains no charge) from an external power source (not shown). This external power source might be supplied via the docking connector 825 or a DC jack socket (not shown). The device might be turned on and off using a single button or when the vehicle ignition is switched on and off.

The navigation device may have one or more hard buttons, at least a power button (not shown). It is pressed once to turn the device on or off. The UI might be designed so that all other operations are easily accessible through the touch screen.

The navigation device may comprise an universal serial bus USB connector 823 and a Bluetooth transceiver 829 for connecting with a PC or other devices such as a mobile phone.

The navigation device might have an integrated speaker 801 to give spoken instructions. The speaker might be driven by an internal amplifier (not shown) and an audio codec 807. Audio line out might also be present on the device or the docking connector 825.

The docking connector 825 provides an interface to external docking stations.

Using the map data correction tool, map errors might be reported or be corrected immediately on the navigation device. Furthermore, the user might make map corrections on a PC connected to the navigation device using a web browser or an application such as the TomTom Home application.

The following is a description of some examples of map corrections that can be made using a navigation device or a suitable PC application.

The user may add the locations of safety cameras on the map;
The user may block roads on the map;
The user may un-block roads on the map;
The user may modify the traffic direction properties of roads on the map;
The user may change a two-way road into a one-way road (in either direction);
The user may change a one-way road to a two-way road;
The user may change the direction of a one-way road to the other direction.
The user may add a road (consisting of one or more nodes) on the map.
The user may connect 2 points on the map and define this new link as a new road.
The user may add street names to un-named roads on the map.
The user may modify the names of roads on the map.
The user may modify the maximum speed of roads on the map.

Once map corrections are present on the navigation device, they might be made available to the user by default or based on various criteria. For example, the user may use private corrections as soon as the corrections are recorded or the user may use public corrections as soon as the corrections have been downloaded to the device.

As some map corrections may have been made by other navigation device owners, the user is able to select which corrections to use when calculating routes.

The user might be able to choose whether to receive warnings for private and/or public reported safety cameras and the user might be able to use or ignore private map corrections whenever they plan a route that includes a correction.

The user might be able to use or ignore public map corrections whenever they plan a route that includes a correction.

The user might be able to configure the device such that private and/or public corrections from one or more categories are automatically included within route calculations. The user might be informed that map corrections are being used.

The user might be able to recalculate routes to include or exclude map corrections.

The user might be able to remove a map correction from the device.

Some map errors are too complicated or large in scale to make corrections on the device itself. These errors need to be reported to the manufacturer of the navigation device, so that the manufacturer (or our map suppliers) can take corrective action. Alternatively, error reports might be sent directly to the map supplier.

The user of the navigation device might have several options when making and using map data corrections and reports.

The user might be able to create map error reports and corrections on the device and upload these to a remote server.

For safety reasons, the user might not be able to create map error reports and corrections while driving.

It is possible to offer users a list of pre-defined error types when creating error reports on the device.

The user might be able to create map error reports and corrections within a PC application such as the TomTom Home and upload these to a remote server.

The user might not have to register or to be a customer in order to create map error reports and corrections.

The user might be able to import map error reports and corrections captured on the device to the PC application such as the TomTom Home application. The user might be able to edit these reports and then upload them to a remote server. The user might receive a feedback regarding reported map errors.

In some circumstances it is possible for the navigation device to suggest corrections to the user, based on use of the navigation device.

For example, the users might be prompted to block roads that they chose to avoid within route plans on multiple occasions.

The user might be prompted to add a road on the map if driving through a map area that is not marked as a road on multiple occasions.

The user might be prompted to add a name to unnamed roads on the map if planning routes to such a road on multiple occasions.

The user might be prompted to modify the speed limit of a road if driving along it at a significantly different speed from that stated in the map data on multiple occasions.

Users of the map data correction tool may wish to share their corrections with other navigation device users. For example, users might be able to create corrections for their personal use only. These corrections will not be sent to the remote server but might be transferred to a PC application such as the TomTom Home application.

The users might be able to create corrections that are shared with other navigation devices. These corrections might be uploaded to the remote server and made available to other navigation devices. The map data corrections might be shared directly between navigation devices, i.e. without using a remote server or a PC.

Users might be able to categorise their public map corrections according to the user community for which it is applicable. The following community categories are possible examples:
  All users;
  All motorists;
  Heavy goods vehicle drivers;
  Motorcyclists;
  Limited speed vehicle drivers;
  Pedestrians;
  Bicycles.

Users may acquire "trusted user" status, based upon the number and quality of map corrections that they upload.

Users might be informed if they attempt to report a map correction that has been corrected in a newer version of the map data that they are using. Users might also be informed how they can purchase the updated map.

In order to use public map corrections the user might retrieve them e.g. from a remote server. The user might download public map corrections to the navigation device and/or to a PC application, such as the TomTom Home application. Public map corrections might be available for one or more community categories.

The user might be able to download public map corrections from one or more community source categories.

The user might be able to download public map corrections from one or more map supplier source categories. A supplier category might be provided for each map supplier.

The user might be able to download public map corrections from one or more location categories, which might comprise the following:
  All maps;
  All maps on device;
  Currently loaded map on device.

In order to allow users to make informed decisions relating to public map corrections, the map data correction tool manages the corrections and provides a categorisation.

Public map corrections might be aggregated by the party hosting the server, i.e. the manufacturer of the navigation device or the map supplier. It is also feasible that map data corrections are collected, stored and aggregated by third parties.

Public map corrections might be analysed in order to assess their source, applicability and trustworthiness. Public map corrections might be distributed to users upon request. Public map corrections might be distributed automatically as well.

The applicability of each map correction might be assessed with respect to each map supplied to users. If a map correction is found not to be applicable for a given map then it might be removed from the aggregated map corrections and not distributed to users of this map. Alternatively, if a map correction is found not applicable, it might be marked and/or sent to further verification.

Map corrections held on the remote server might be categorised by source so that the user can be informed of the relative trustworthiness of the correction's source.

Specific map corrections might be endorsed and represented to the user in a specific category.

Map corrections that have been reported by a single user might be represented to other users in a specific category.

Map corrections that have been reported by more than one user might be represented to other users in specific categories. Specifically, the following categories might be represented:
  Reported by 2-5 users;
  Reported by more than 5 users.

Map corrections that have been reported by trusted users shall be represented to other users in a specific category.

Users of the map data correction tool might be able to endorse map corrections made by other users and evidence of these endorsements might be represented to the user.

In order to gain (and maintain) a competitive advantage from New York, it is imperative that map correction data is held in a structured, re-usable and secure way. This section describes the constraints relating to security.

Each map correction might be uniquely identified.

Map corrections might be time stamped with the time at which they were input and/or reported.

Each map correction might be stored in a form that allows it to be applied to the map independently of all other map corrections (i.e. the navigation device or navigation software on a PDA shall be able to decide on a per-correction basis whether the correction should be applied to the map and represented to the user).

Map corrections might not make a permanent modification to the user's map data.

Map corrections might be compressed to allow fast and cheap distribution over wireless networks.

Map corrections might be highly encrypted such that it is not possible for the data format to be reverse engineered.

Map corrections might be stored in such a way that they are retained though a map upgrade process.

Map corrections might be compatible with future map versions, such that corrections made on older versions of a map can be applied to the latest version.

Map corrections might not be compatible with previous map versions. It might not be possible to apply a map correction made on the current map version with a previous map version.

Map corrections might be independent of map supplier, such that map corrections can be applied to maps from different suppliers.

Map corrections might be compatible with the map supplier's, e.g. Tele Atlas, map reporting API such that it is possible to send correctly formatted reports to the map supplier.

In order to ensure that map corrections are correctly handled on the user's device, certain rules might be applied. This section describes some examples of the constraints relating to on-device map correction handling.

Map corrections created on previous map versions might be checked to see if they are applicable to the currently loaded map on the user's device. Map corrections that are not applicable might not be used within route calculations.

In order to manage map error reports in a more effective manner, the recipient of the error reports, e.g. the manufacturer of the navigation device or the map supplier, might implement a method for aggregating and prioritising error reports.

Map error reports might be aggregated from various sources, including user devices, pc applications, and websites.

Map error reports might be assessed and assigned to priorities, such that the most serious errors might be highlighted. These priorities might be communicated to map suppliers when submitting error reports to them.

The user shall be able to modify the names of cities (and other places) on the map.

The user might block access to a road for one or more transportation types. Specifically the user might block access for the following transportation types:

All motor vehicles;
Pedestrians;
Heavy Goods Vehicles;
Bicycles.

The user might un-block access to a road for one or more transportation types. Specifically the user might un-block access for the following transportation types:

All motor vehicles;
Pedestrians;
Heavy Goods Vehicles;
Bicycles.

Besides the above described examples, the user of the navigation device (or a suitable computer application) might take various corrective actions, which might include, but are not limited to, any of the following:

The user might modify the "class" of roads on the map;
The user might add turn restrictions to roads on the map;
The user might remove turn restrictions applied to roads on the map;
The user might add house numbers (either a single number or a range) to roads on the map;
The user might modify the location of house numbers (either a single number or a range) applied to roads on the map;
The user might modify the average speed of roads on the map;
The user might mark a road on the map as a toll road;
The user might remove the presence of a toll from roads on the map;
The user might add signpost information to roads on the map;
The user might modify the properties of signpost information associated with roads on the map;
The user might remove signpost information associated with roads on the map;
The user might modify the location of POI on the map;
The user might modify the names of POI on the map;
The user might modify the category of POI on the map;
The user might remove POI from the map;
The user might modify the exit numbers of motorways on the map;
The user might modify the post code associated with a road on the map;
The user might add road height restrictions to roads on the map;
The user might add road width restrictions to roads on the map;
The user might add road weight restrictions to roads on the map;

Some map errors might be too complicated or large in scale to make corrections on the device itself. These errors might be reported to map suppliers to take corrective action.

The invention has been described with reference to certain preferred embodiments. It will be understood, however, that modifications and variations are possible within the scope of the appended claims.

What is claimed is:

1. A method of creating map alterations on a navigation device, the method comprising the steps of:
   loading a map onto said device;
   providing a menu driven selection of possible alterations in a display of said navigation device, said providing comprising displaying, in said display, a plurality of graphical icons having visual appearances of respective traffic signs, each graphical icon being associated with at least one map alteration corresponding to a subject matter of said respective traffic sign;
   receiving an input that selects, from among said plurality of graphical icons displayed in said display, a graphical icon associated with at least one alteration to be made to said map;
   receiving an input that places, in at least a portion of said map that is displayed in said display, said graphical icon, said graphical icon being placed within said display of said at least said portion of said map at a specified location at which said at least one alteration is to be made to said map;

generating, based on said graphical icon and said specified location, a map correction comprising said at least one alteration;

storing said map correction in a map fix database;

subsequently retrieving said map correction from said map fix database;

planning a route using said map and said map correction, said planning comprising accounting for said map correction for a newly-generated route; and providing guidance to enable navigation along said route.

2. The method according to claim 1, wherein said step of storing said map correction in said map fix database further comprises associating a unique identifier with said stored map correction and storing said unique identifier with said stored map correction.

3. The method according to claim 1, further comprising the step of storing a time stamp with said map correction in said map fix database, said time stamp indicative of when said map correction was stored.

4. The method according to claim 1, further comprising the step of, when the map correction was generated based on an alteration that is designated as shared, transmitting said map correction to the server.

5. The method according to claim 1, further comprising the step of activating an icon or menu option to change map data stored on said device.

6. The method according to claim 5, wherein said step of activating further comprises the step of displaying a lower level options menu comprising one or more icons or other menu options for affecting map data changes.

7. The method according to claim 1, wherein said map correction comprises one or more of: blocking a street on a map; unblocking a street on a map; changing a speed limit on a street on a map; at least one of renaming, moving, adding, deleting and re-categorising a POI; a modification to a name of at least one of a city, part of a city, street and part of a street; a change in of direction of road traffic; an addition of a road or a connection of at least two roads; an added turn restriction; a removed turn restriction; a modified structure number; a modification to a toll status of a road; a modified sign post; a modification to a motorway exit number; a modification to a postcode associated with a location; a modification to a vehicle height, weight or width restriction on a particular road.

8. The method according to claim 1, further comprising the step of associating said map correction with one or more transportation types.

9. The method according to claim 8, wherein associating said map correction with one or more transportation types comprises blocking access for at least one of a motor vehicle; pedestrian; heavy goods vehicle; and bicycle.

10. The method according to claim 1, wherein said step of placing further comprises the steps of clicking and dragging said graphical icon.

11. The method according to claim 1, wherein said map correction does not permanently affect the map data stored on the device.

12. The method according to claim 1, further comprising the step of suggesting a map correction to a device user.

13. The method according to claim 12, wherein said suggestion is made when a user deviates from a route in accordance with said map correction.

14. The method according to claim 1, wherein said map correction is generated, after selection of one of said alterations and a location where said alteration should take effect, by displaying a map including said location and by placing a traffic sign corresponding to the map correction at said location by touching a display where said traffic sign is displayed thereon.

15. The method according to claim 1, wherein said map correction is configured so that said map correction can be used with said map for determining said route independently of other map corrections in said map fix database; and wherein determining said route comprises determining, for each map correction, based on one or more rules, whether said map correction and zero or more other map corrections from said map fix database are to be used for determining the route.

16. The method according to claim 1, wherein said map correction is independent of a supplier that supplied the map, in that the map correction is configured to be usable both with maps from the supplier and from at least one other supplier.

17. A navigation device comprising memory, a display, and a processor arranged to:

load a map onto said device;

provide a menu driven selection of possible alterations in said display, said providing comprising displaying, in said display, a plurality of graphical icons having visual appearances of respective traffic signs, each graphical icon being associated with at least one map alteration corresponding to a subject matter of said respective traffic sign;

receive an input that selects, from among said plurality of graphical icons displayed in said display, a graphical icon associated with at least one alteration to be made to said map;

receive an input that places, in at least a portion of said map that is displayed in said display, said graphical icon, said graphical icon being placed within said display of said at least said portion of said map at a specified location at which said at least one alteration is to be made to said map;

generate, based on said graphical icon and said specified location, a map correction comprising said at least one alteration;

store said map correction in a map fix database;

subsequently retrieve said map correction from said map fix database;

plan a route using said map and said map correction, said planning comprising accounting for said map correction for a newly-generated route; and provide guidance to enable navigation along said route.

18. A non-transitory computer-readable medium which stores a set of instructions which when executed performs a method of creating map alterations on a navigation device, the method executed by the set of instructions comprising:

loading a map onto said device;

providing a menu driven selection of possible alterations in a display of said navigation device, said providing comprising displaying, in said display, a plurality of graphical icons having visual appearances of respective traffic signs, each graphical icon being associated with at least one map alteration corresponding to a subject matter of said respective traffic sign;

receiving an input that selects, from among said plurality of graphical icons displayed in said display, a graphical icon associated with at least one alteration to be made to said map;

receiving an input that places, in at least a portion of said map that is displayed in said display, said graphical icon, said graphical icon being placed within said display of said at least said portion of said map at a specified location at which said at least one alteration is to be made to said map;

generating, based on said graphical icon and said specified location, a map correction comprising said at least one alteration;

storing said map correction in a map fix database;

subsequently retrieving said map correction from said map fix database;

planning a route using said map and said map correction, said planning comprising accounting for said map correction for a newly-generated route; and providing guidance to enable navigation along said route.

* * * * *